US012287682B2

United States Patent
Miyamoto et al.

(10) Patent No.: US 12,287,682 B2
(45) Date of Patent: Apr. 29, 2025

(54) ELECTRONIC APPARATUS (71) Applicant: Lenovo (Singapore) Pte. Ltd., Singapore (SG)

(72) Inventors: Tabito Miyamoto, Kanagawa (JP); Yalu Liu, Kanagawa (JP); Hiroaki Kinoshita, Kanagawa (JP); Takayuki Morino, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 194 days.

(21) Appl. No.: 18/174,655

(22) Filed: Feb. 27, 2023

(65) Prior Publication Data
US 2023/0305602 A1  Sep. 28, 2023

(30) Foreign Application Priority Data
Mar. 23, 2022  (JP) .................................. 2022-046909

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)
(58) Field of Classification Search
CPC ............................ G06F 1/1681; G06F 1/1683
See application file for complete search history.

(56) References Cited

U.S. PATENT DOCUMENTS

| | | | | |
|---|---|---|---|---|
| 10,401,926 B1* | 9/2019 | North | ................ | G06F 1/1618 |
| 11,455,004 B2* | 9/2022 | Kinoshita | ............ | G06F 1/1681 |
| 11,487,329 B2* | 11/2022 | Tsuchihashi | .......... | G06F 1/1652 |
| 11,490,185 B2* | 11/2022 | Niu | ........................ | H04R 19/04 |
| 11,520,382 B2* | 12/2022 | Shibayama | ........... | G06F 1/1652 |
| 11,723,170 B2* | 8/2023 | Ohyama | ............... | G06F 1/1626 |
| | | | | 361/679.27 |
| 11,758,672 B2* | 9/2023 | Morino | ................ | H05K 5/0226 |
| | | | | 361/807 |
| 2018/0324964 A1* | 11/2018 | Yoo | .......................... | H05K 5/03 |
| 2019/0354148 A1* | 11/2019 | Delano | ................... | G06F 1/203 |
| 2022/0174386 A1* | 6/2022 | Niu | ........................ | H04R 19/04 |
| 2022/0232729 A1* | 7/2022 | Ohyama | .............. | H05K 5/0017 |
| 2022/0338362 A1* | 10/2022 | Morino | ................ | H05K 5/0226 |
| 2024/0211000 A1* | 6/2024 | Kinoshita | ............. | G06F 1/1616 |
| 2024/0211004 A1* | 6/2024 | Kinoshita | ............. | G06F 1/1681 |

FOREIGN PATENT DOCUMENTS

| | | |
|---|---|---|
| JP | 2003-158355 A | 5/2003 |
| JP | 6636125 B1 | 1/2020 |

\* cited by examiner

*Primary Examiner* — Adrian S Wilson
(74) *Attorney, Agent, or Firm* — Osha Bergman Watanabe & Burton LLP (57) ABSTRACT

The electronic apparatus includes a first chassis equipped with a first electronic component, a second chassis equipped with a second electronic component, a hinge device that relatively rotatably connects the first chassis and the second chassis, and a flexible board provided over the first chassis and the second chassis and connecting the first electronic component and the second electronic component. The flexible board has a first folded portion and a second folded portion that are disposed in order and curved in opposite directions to each other in the first chassis.

8 Claims, 6 Drawing Sheets

ELECTRONIC APPARATUS

CROSS-REFERENCE TO RELATED APPLICATIONS

This application claims priority to Japanese Patent Application No. 2022-46909 filed on Mar. 23, 2022, the contents of which are hereby incorporated herein by reference in their entirety.

BACKGROUND OF THE INVENTION

Field of the Invention

The present invention relates to an electronic apparatus in which a plurality of chassis are relatively rotatably connected.

Description of the Related Art

In recent years, electronic apparatuses such as PCs and smartphones that have a touch panel type liquid crystal display and do not have a physical keyboard are rapidly spreading. The display of this type of electronic apparatus is desired to be large when in use, but it is desired to be made smaller when not in use. An electronic apparatus configured so that the chassis can be folded by using a flexible display such as organic Electro Luminescence (EL) (see, for example, Japanese Patent Application No. 6636125).

In the electronic apparatus as described above, wiring for connecting electronic components mounted on left and right chassis causes an expansion/contraction operation due to an inner ring difference that occurs during a rotation operation between the chassis. That is, the wiring is extended in a state where the chassis are folded, and an extra length is generated in a state where the chassis are open.

In the configuration of Japanese Patent Application No. 6636125, a groove portion is provided in a rear cover member located at a boundary between the left and right chassis, and the wiring is bent in a horizontal direction in the groove portion to absorb the extra length of the wiring. As described above, in a case of a general cable-shaped wiring in which a metal wire is insulated and coated, the expansion/contraction operation can be absorbed by simply bending the wiring in the horizontal direction.

By the way, in a case in which the amount of information transmitted and received between the left and right chassis is large or the like, and when the general wiring becomes too thick, it is conceivable to use a flexible board. However, since the flexible board cannot be bent in the horizontal direction, the extra length cannot be absorbed by the structure of Japanese Patent Application No. 6636125. On the other hand, in a case in which the flexible board is extended between the left and right chassis without considering the absorption of the extra length, the flexible board flutters during the rotation operation of the chassis, and it is difficult to smoothly absorb the extra length. The extra length of the flexible board can also occur in a foldable electronic apparatus that does not use a flexible display.

SUMMARY OF THE INVENTION

One or more embodiments of the invention provide an electronic apparatus capable of smoothly absorbing the extra length of the flexible board between the chassis that are relatively rotatably connected.

An electronic apparatus according to a first aspect of the present invention includes: a first chassis equipped with a first electronic component; a second chassis adjacent to the first chassis and equipped with a second electronic component; a hinge device that relatively rotatably connects the first chassis and the second chassis between a first posture in which the first chassis and the second chassis are stacked so as to overlap each other in a surface normal direction and a second posture in which the first chassis and the second chassis are aligned in a direction perpendicular to the surface normal direction; and a flexible board provided over the first chassis and the second chassis and connecting the first electronic component and the second electronic component, in which the flexible board has a first folded portion and a second folded portion that are disposed in order and curved in opposite directions to each other in the first chassis.

The above-described aspects of present invention can smoothly absorb the extra length of the flexible board between the chassis that are relatively rotatably connected.

DETAILED DESCRIPTION OF THE INVENTION

Hereinafter, an electronic apparatus according to the present invention will be described in detail with embodiments with reference to the accompanying drawings.

Figure 1:
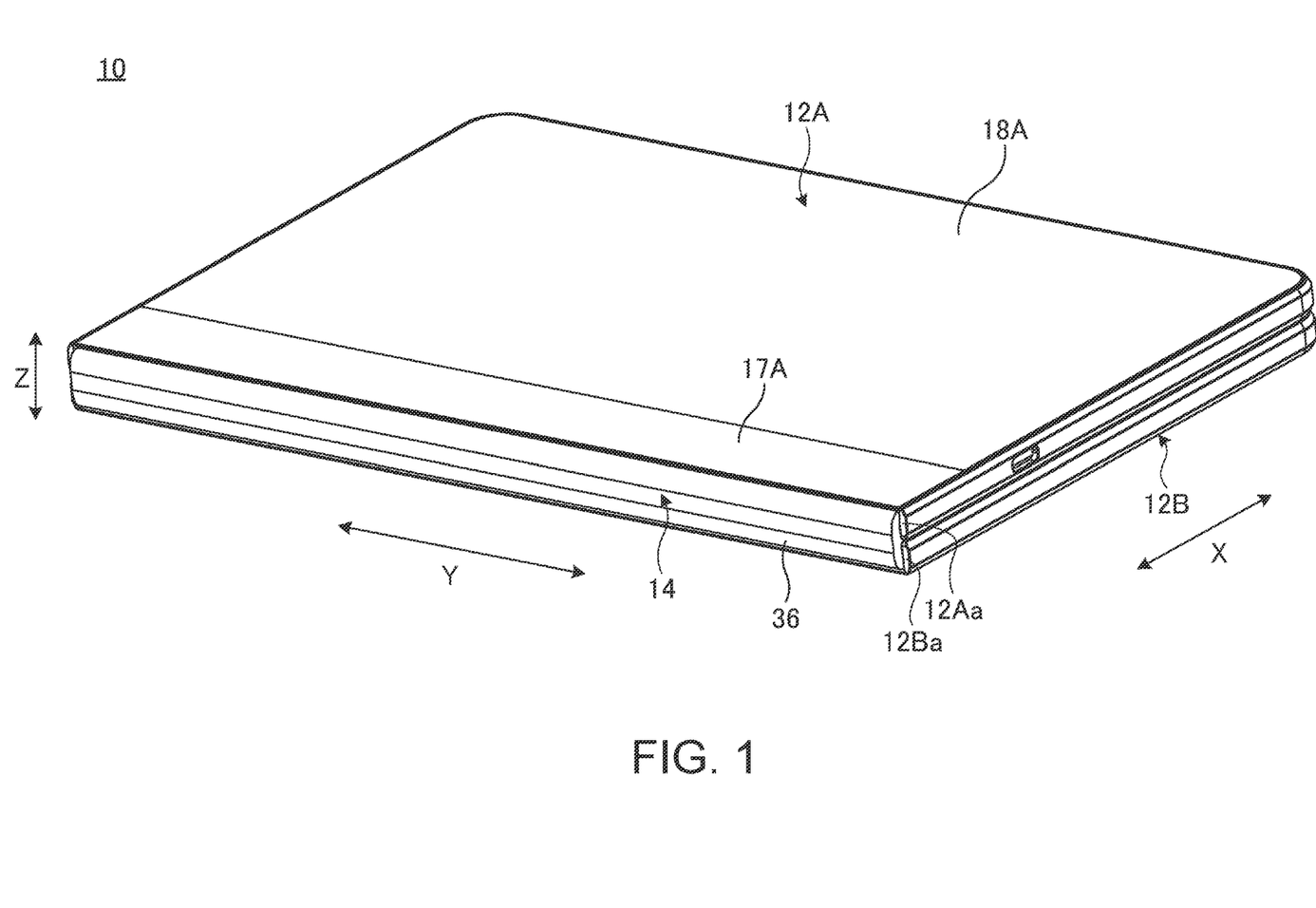
FIG. 1 is a perspective view schematically illustrating a state in which an electronic apparatus according to one or more embodiments is closed and in a 0-degree posture.
Figure 2:
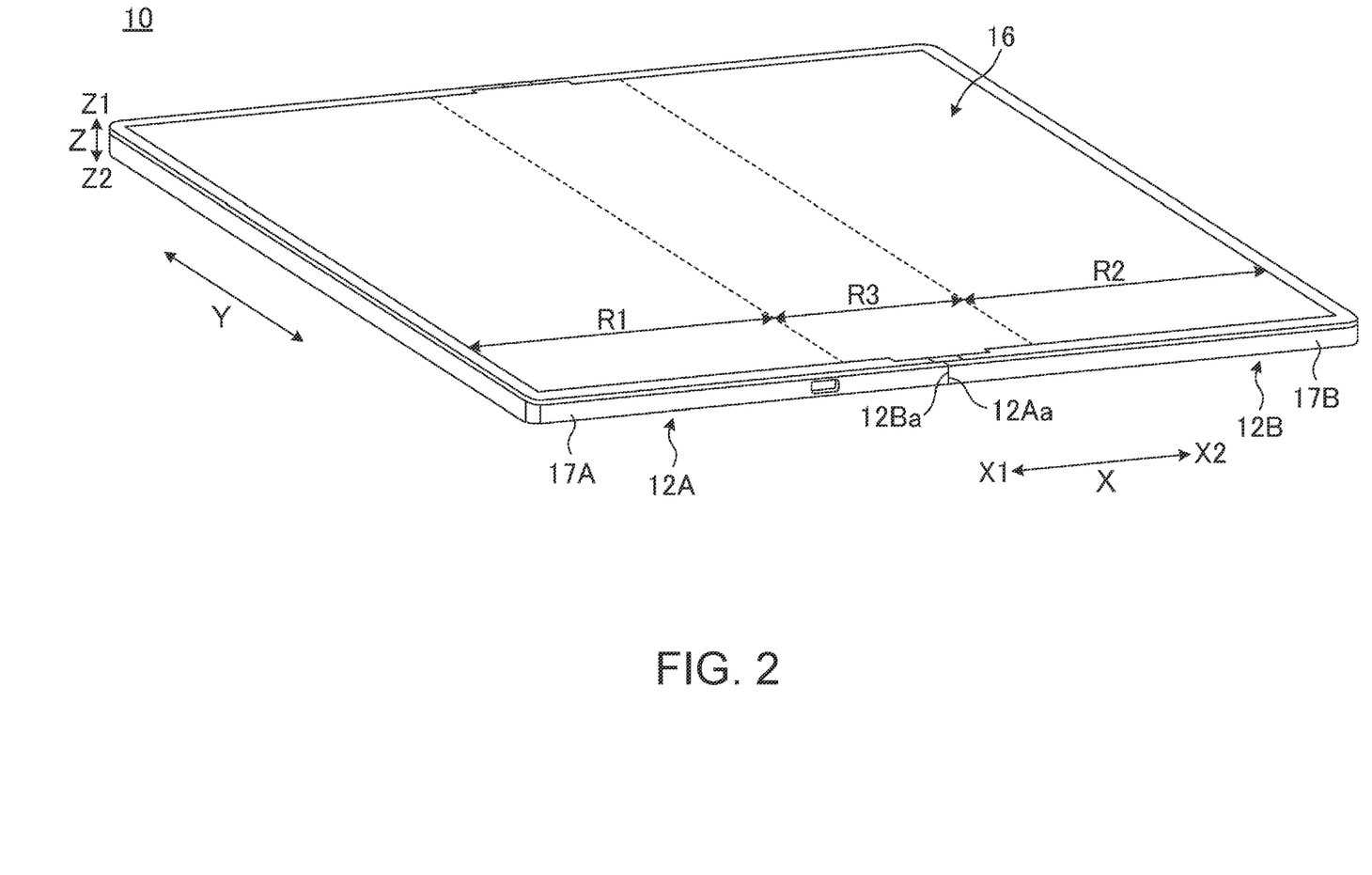
FIG. 2 is a perspective view schematically illustrating a state in which the electronic apparatus illustrated in FIG. 1 is opened and in a 180-degree posture.
Figure 3:
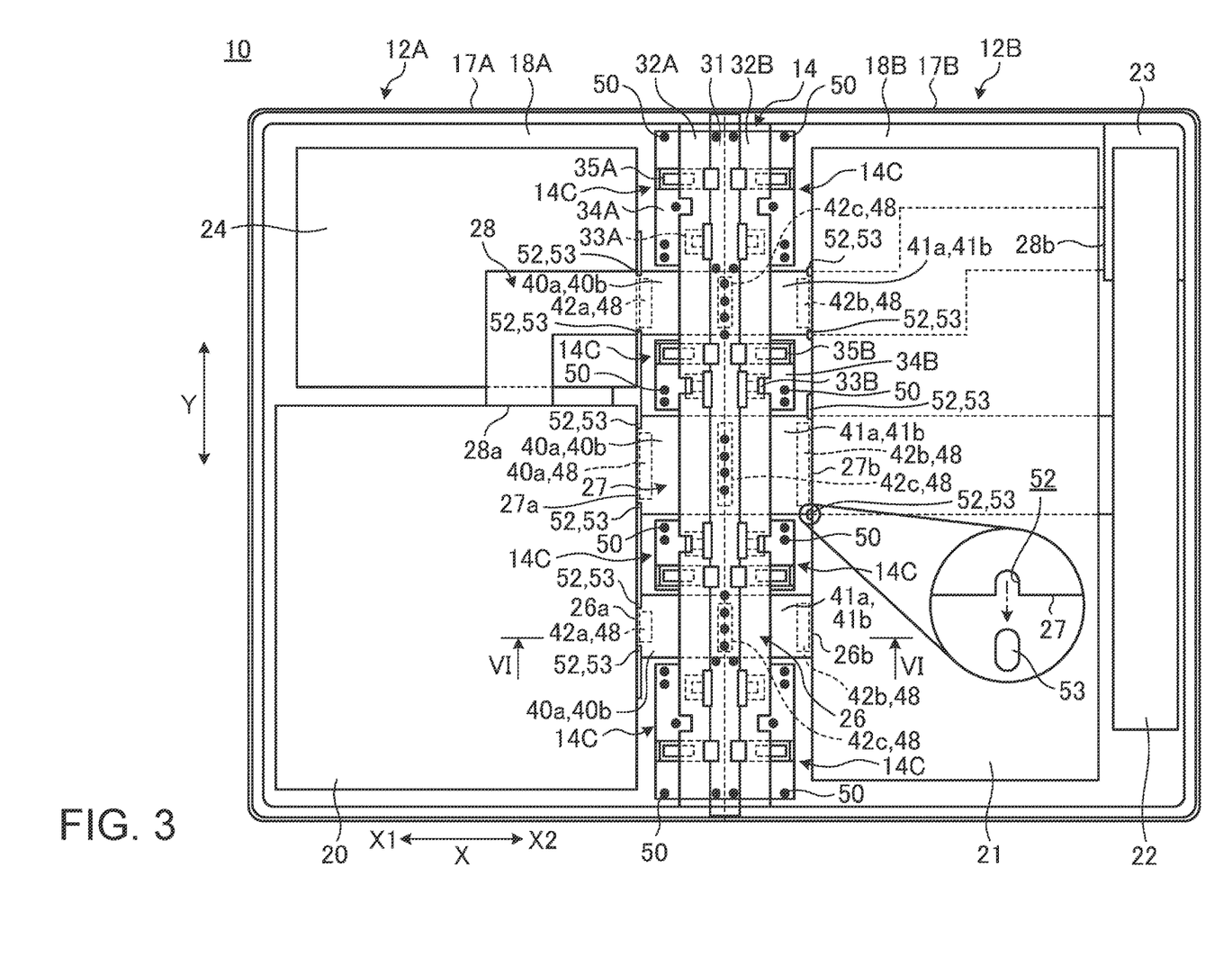
FIG. 3 is a plan view schematically illustrating an internal structure of the electronic apparatus illustrated in FIG. 2.

FIG. 1 is a perspective view schematically illustrating a state in which an electronic apparatus 10 according to one or more embodiments is closed and in a 0-degree posture. FIG. 2 is a perspective view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2.

As illustrated in FIGS. 1 to 3, the electronic apparatus 10 includes a first chassis 12A, a second chassis 12B, a hinge device 14, and a display 16. The electronic apparatus 10 of one or more embodiments exemplifies a tablet PC or a laptop PC that is capable of being folded like a book. The electronic apparatus 10 may be a smartphone, a portable game machine, or the like.

Each of the chassis 12A and 12B is disposed adjacent to each other. The first chassis 12A includes a frame member 17A and a cover member 18A. The frame member 17A is a rectangular frame-shaped member forming standing walls formed on three sides other than an adjacent end portion 12Aa adjacent to the second chassis 12B. The cover member 18A is a plate-shaped member that closes a rear surface opening of the frame member 17A (see also FIG. 4A). Similarly, the second chassis 12B includes a frame member 17B forming standing walls on three sides other than an adjacent end portion 12Ba adjacent to the first chassis 12A, and a cover member 18B that closes a rear surface opening of the frame member 17B. Front surface openings of the frame members 17A and 17B are closed with the display 16.

Each member 17A, 17B, 18A, and 18B is made of, for example, a metal member such as stainless steel, magnesium, or aluminum, or a fiber-reinforced resin plate containing reinforcing fibers such as carbon fiber, and the like.

The hinge device 14 connects the chassis 12A and 12B so as to be relatively rotatable between the 0-degree posture and the 180-degree posture. The hinge device 14 also functions as a rear cover that hides a gap between the adjacent end portions 12Aa and 12Ba formed in the 0-degree posture illustrated in FIG. 1.

Hereinafter, as for the electronic apparatus 10, description is performed while a direction in which the chassis 12A and 12B are aligned is called an X direction, a direction along the adjacent end portions 12Aa and 12Ba orthogonal to the X direction is called a Y direction, and a thickness direction of the chassis 12A and 12B is called a Z direction. As for the X direction, a direction from the second chassis 12B to the first chassis 12A may be called an X1 direction, and a direction opposite to the X1 direction may be called an X2 direction. As for the Z direction, a direction from the rear surface to the front surface of each of the chassis 12A and 12B, that is, the direction from inner surfaces 12Ab and 12Bb toward the display 16 is called a Z1 direction, and a direction opposite to the Z1 direction is called a Z2 direction. As for the angular posture between the chassis 12A and 12B, description is performed while a state in which the chassis 12A and 12B are stacked so as to overlap each other in the surface normal direction is called the 0-degree posture (see FIG. 1), and a state in which the chassis 12A and 12B are aligned in a direction perpendicular to the surface normal direction (X direction) is called the 180-degree posture (see FIG. 2 and FIG. 4A). It is possible to call the posture between 0 and 180 degrees by appropriately carving the angle, and, for example, a state in which the surface normal directions of the chassis 12A and 12B are orthogonal to each other is a 90-degree posture. These angles are for convenience of description, and an actual product may of course have angular positions slightly deviated from the exact angular positions indicated by angle numbers.

As illustrated in FIG. 3, a motherboard 20 is mounted on the first chassis 12A. Electronic components such as a central processing unit (CPU), a communication module, and a solid state drive (SSD) are mounted on the motherboard 20. The CPU is a processing device that performs computing related to primary control or processing of the electronic apparatus 10. The communication module is compatible with, for example, a wireless WAN or a fifth-generation mobile communication system, and performs information processing on wireless communication transmitted and received via an antenna mounted in the chassis 12A and 12B. The SSD is a storage device that uses a semiconductor memory. Various electronic components other than the motherboard 20 are mounted on the first chassis 12A.

A battery device 21, a display board 22, and a sub card 23 are mounted on the second chassis 12B. The battery device 21 is a secondary battery that serves as a main power source for the electronic apparatus 10. A battery device 24 serving as a sub power source is mounted on the first chassis 12A. The display board 22 is a control board of the display 16. The sub card 23 is a board on which, for example, a power button, an external connector conforming to a Universal Serial Bus (USB) standard, and the like are mounted. Various electronic components other than the battery device 21 and the like are mounted on the second chassis 12B.

In the electronic apparatus 10, the motherboard 20 may be mounted on the second chassis 12B, and the battery device 21 or the like may be mounted on the first chassis 12A. In the electronic apparatus 10, the disposition of each electronic component may be appropriately changed, for example, the motherboard 20 and the sub card 23 may be mounted in the first chassis 12A, the battery device 21 may be mounted in the second chassis 12B, and the like.

As illustrated in FIG. 3, the chassis 12A and 12B are electrically connected to each other by, for example, three flexible boards 26, 27, and 28. The flexible boards 26 to 28 are flexible printed circuits (FPCs) formed thinly and flexibly by using a flexible insulating film.

As illustrated in FIG. 3, the flexible board 26 is formed in a linear shape along the X direction. In the flexible board 26, a first end portion 26a on the first chassis 12A side is connected to the motherboard 20, and a second end portion 26b on the second chassis 12B side is connected to the battery device 21.

The flexible board 27 is formed in a linear shape along the X direction, and has a longer overall length than the flexible board 26. In the flexible board 27, a first end portion 27a on the first chassis 12A side is connected to the motherboard 20, and a second end portion 27b on the second chassis 12B side is connected to the display board 22.

The flexible board 28 has a crank shape that extends in the X direction and is partially bent in the Y direction, and has a longer overall length than the flexible board 27. In the flexible board 28, a first end portion 28a on the first chassis 12A side is connected to the motherboard 20, and a second end portion 28b on the second chassis 12B side is connected to the sub card 23.

The connection target of the flexible boards 26 to 28 may be other than the above. The number of installed flexible boards 26 to 28 may be changed.

Figure 4A:
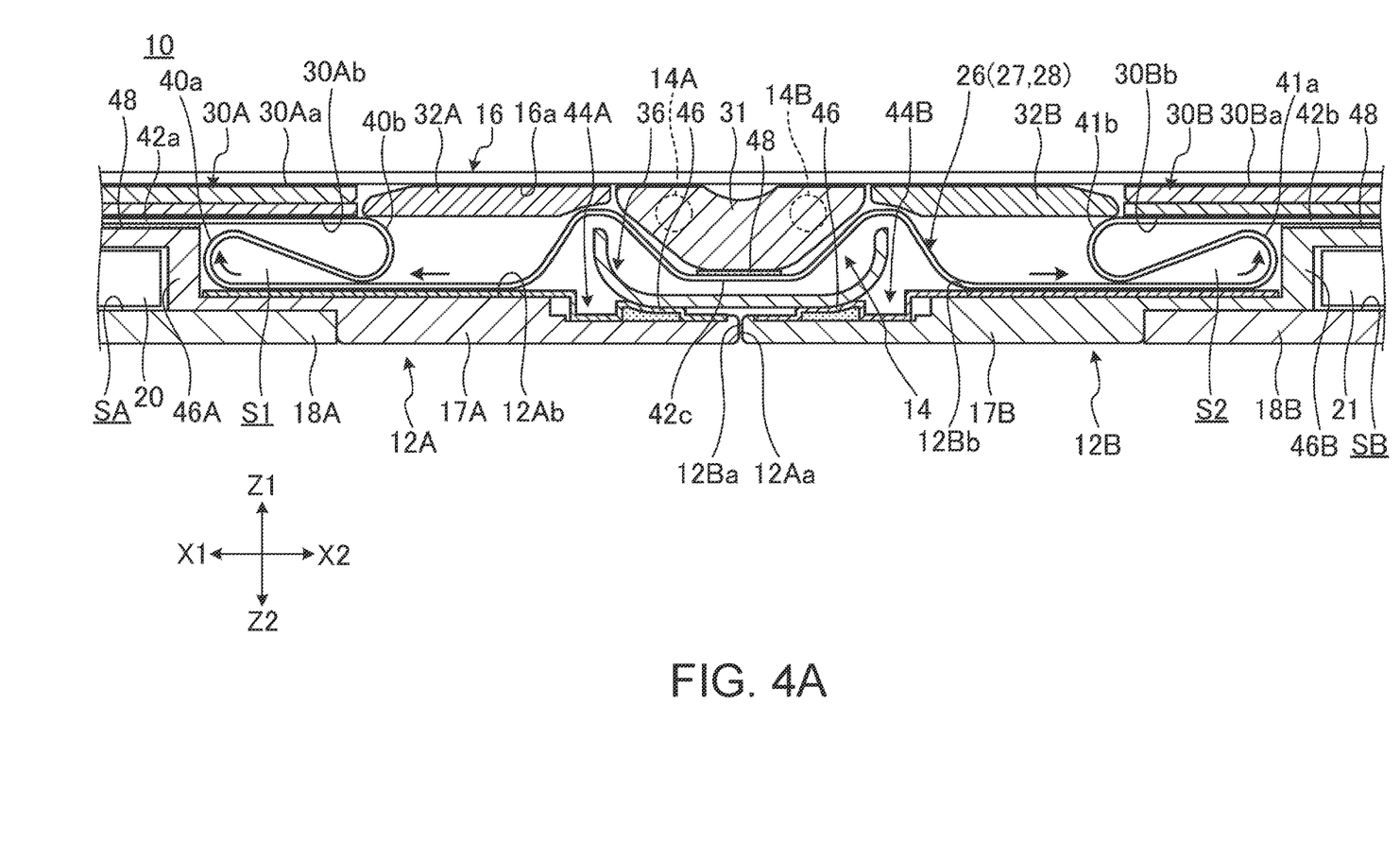
FIG. 4A is a schematic cross-sectional view taken along line VI-VI in FIG. 3.
Figure 4B:
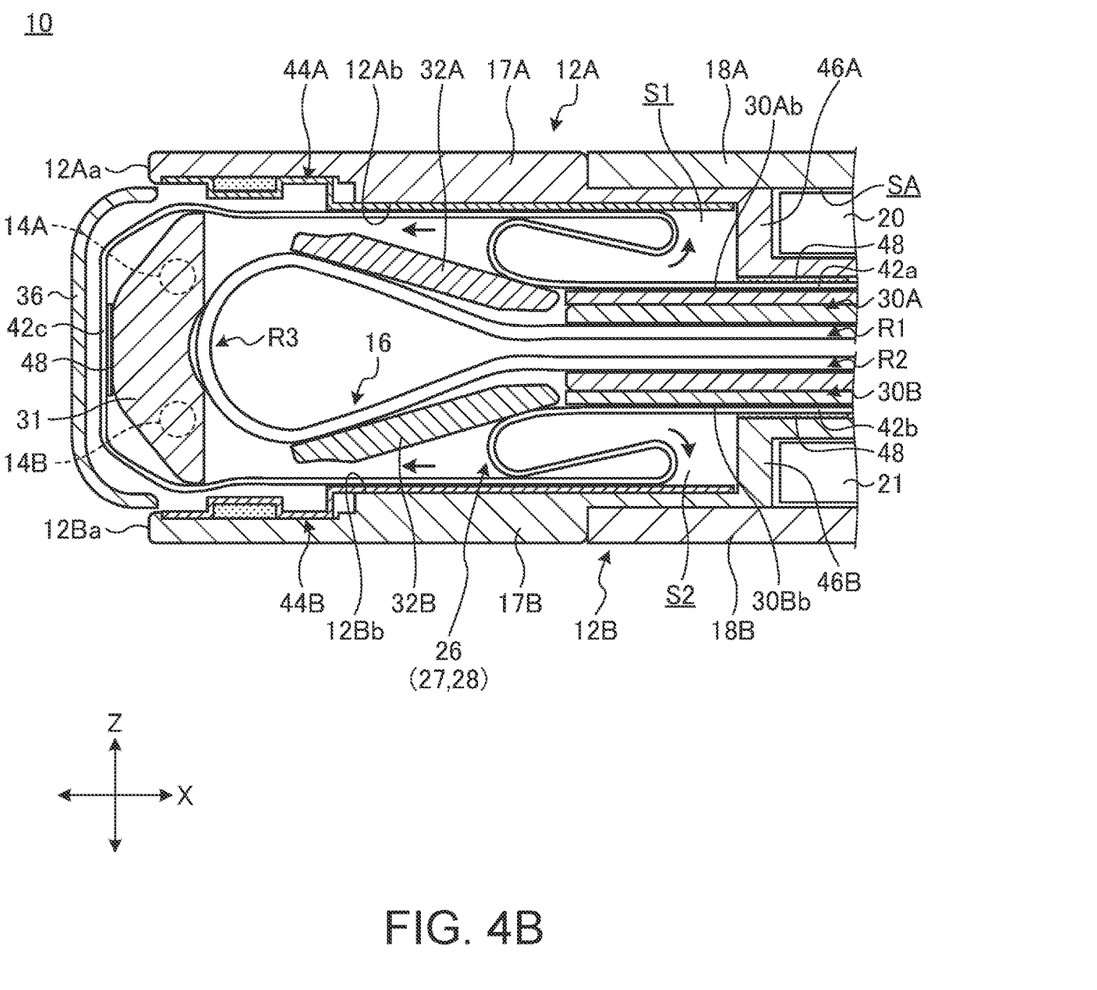
FIG. 4B is a schematic cross-sectional view illustrating a state in which the electronic apparatus illustrated in FIG. 4A is in the 0-degree posture.

FIG. 4A is a schematic cross-sectional view taken along line VI-VI in FIG. 3. FIG. 4B is a schematic cross-sectional view illustrating a state in which the electronic apparatus 10 illustrated in FIG. 4A is in the 0-degree posture.

In the 0-degree posture illustrated in FIGS. 1 and 4B, the chassis 12A and 12B are in a state of being folded in half. The display 16 is a paper-shaped flexible display formed of organic EL. At the 0-degree posture, the display 16 is disposed such that a region R1 on the first chassis 12A side faces a region R2 on the second chassis 12B side, which are illustrated in FIG. 2, and a folding region R3, which is a boundary region between the regions R1 and R2, is in a state of being bent in an arc shape. In the 180-degree posture illustrated in FIGS. 2 to 4A, the chassis 12A and 12B are disposed side by side with each other. At this time, the display 16 has the regions R1 and R2 and the folding region R3 disposed side by side on a XY plane, and forms a flat plate shape as a whole.

The display 16 has the region R1 relatively fixed to the first chassis 12A and the region R2 relatively fixed to the second chassis 12B. Specifically, as illustrated in FIG. 4A, a rear surface 16a of the region R1 is fixed to the first chassis 12A via a first plate 30A, and a rear surface 16a of the region R2 is fixed to the second chassis 12B via a second plate 30B.

The plates 30A and 30B are disposed on left and right to interpose the hinge device 14 therebetween, and support the display 16 with the respective front surfaces 30Aa and 30Ba.

The rear surface 16a of the display 16 has the region R1 adhesively fixed to the front surface 30Aa of the first plate 30A and the region R2 adhesively fixed to the front surface 30Ba of the second plate 30B. The plates 30A and 30B have a configuration in which a metal frame made of a magnesium alloy surrounds a carbon fiber reinforced resin plate in which carbon fibers are impregnated with a matrix resin such as epoxy resin and an outer periphery of the rear surface of the carbon fiber reinforced resin plate.

The folding region R3 of the display 16 is capable of relatively moving with respect to the chassis 12A and 12B. In the 180-degree posture, the rear surface 16a of the folding region R3 is supported by the hinge device 14 (see FIG. 4A). In the 0-degree posture, the folding region R3 is bent in an arc shape, a part of the rear surface 16a is supported by the hinge device 14, and most of the rear surface 16a is separated from the hinge device 14 (see FIG. 4B).

As illustrated in FIGS. 3 to 4B, the hinge device 14 of one or more embodiments has a hinge main body 31, a first support plate 32A, and a second support plate 32B.

The hinge main body 31 is provided at a position straddling the adjacent end portions 12Aa and 12Ba of the chassis 12A and 12B, and extends over the substantially overall length in the Y direction along the adjacent end portions 12Aa and 12Ba. The hinge main body 31 is a block-shaped component formed of a metal material such as aluminum. The hinge main body 31 supports two hinge shafts 14A and 14B aligned in the X direction in the 180-degree posture (see FIG. 7).

As illustrated in FIG. 3, a first end portion of a first link arm 33A is rotatably supported on the first hinge shaft 14A. A second end portion of the first link arm 33A is connected to a first bracket 34A using a rotation shaft so as to be relatively rotatable. The first bracket 34A is screw-fixed to an inner surface 12Ab of the first chassis 12A. A first support arm 35A that assists the operation of the first link arm 33A is further supported between the first hinge shaft 14A and the first bracket 34A.

The first bracket 34A and the second bracket 34B having a bilaterally symmetrical structure are fixed to an inner surface 12Bb of the second chassis 12B. The second hinge shaft 14B and the second bracket 34B are also connected by a second link arm 33B and a second support arm 35B similar to the first link arm 33A and the first support arm 35A.

As illustrated in FIG. 3, the hinge device 14 has a plurality of movable portions 14C in which one first link arm 33A and one first support arm 35A are connected to one first bracket 34A. The movable portions 14C are disposed with a gap from each other along the Y direction, which is a longitudinal direction of the hinge main body 31. The second bracket 34B, the second link arm 33B, and the second support arm 35B also form a similar movable portion 14C. Thereby, the hinge main body 31 connects the chassis 12A and 12B so as to be relatively rotatable. A gear mechanism for synchronizing the rotation operation between the chassis 12A and 12B, a torque mechanism for applying a predetermined rotational torque to the rotation operation between the chassis 12A and 12B, and the like are also provided inside the hinge main body 31.

As illustrated in FIGS. 1, 4A, and 4B, a rear cover component 36 serving as a decorative cover is attached to an outer surface of the hinge main body 31. The rear cover component 36 is a substantially U-shaped metal plate that matches the outer surface shape of the hinge main body 31. The flexible boards 26 to 28 pass between the hinge main body 31 and the rear cover component 36 at a position straddling the adjacent end portions 12Aa and 12Ba.

In the 180-degree posture illustrated in FIG. 4A, the hinge main body 31 is accommodated in the chassis 12A and 12B, and straddles the adjacent end portions 12Aa and 12Ba close to each other in the X direction. In the 0-degree posture illustrated in FIG. 4B, the hinge main body 31 is disposed so as to close a gap formed between the adjacent end portions 12Aa and 12Ba which are largely separated from each other. At this time, deterioration of an appearance design of the folded electronic apparatus 10 is prevented by disposing the rear cover component 36 to the outermost surface (see FIG. 1).

The support plates 32A and 32B are plates formed of a metal material such as aluminum, and have bilaterally symmetrical shapes. The support plates 32A and 32B are provided on the sides of the inner surfaces 12Ab and 12Bb of the chassis 12A and 12B, and extend over the substantially overall length in the Y direction along the adjacent end portions 12Aa and 12Ba.

The first support plate 32A is disposed between the first plate 30A and the hinge main body 31. The first support plate 32A has an edge portion on the side of the first plate 30A, which is connected to the first bracket 31A so as to be relatively rotatable via the rotation shaft. The first support plate 32A has an edge portion on the side of the hinge main body 31, which is relatively movable with respect to the hinge main body 31. Since the configuration, mounting structure, and the like of the second support plate 32B are bilaterally symmetrical with those of the first support plate 32A, detailed description thereof will be omitted.

The support plates 32A and 32B swing according to the rotation operation of the chassis 12A and 12B. In the 180-degree posture, the support plates 32A and 32B support the rear surface 16a of the folding region R3 of the display 16 by the front surfaces of the support plates 32A and 32B. In the angular postures other than 180 degrees, the support plates 32A and 32B come into contact with the display 16 in a state in which a gap is provided between the support plates 32A and 32B and the display 16 or with a slight force that does not deform the display 16 (see FIG. 4B). The support plates 32A and 32B may be configured to support the folding region R3 of the display 16 even in an angular posture other than 180 degrees and to correct the shape of the folding region R3. As described above, in the 180-degree posture, the support plates 32A and 32B stably support the folding region R3 of the display 16 in a plane, and the support plates 32A and 32B do not hinder the folding operation of the folding region R3.

Next, a specific configuration of the flexible board 26 (27 and 28) will be described.

FIGS. 4A and 4B typically illustrate the configuration of the flexible board 26 and its peripheral portions, but the configurations of the other flexible boards 27 and 28 and their peripheral portions may be the same or similar to those illustrated in FIGS. 4A and 4B. Therefore, in the following description, for the other flexible boards 27 and 28, the same or similar components as those of the flexible board 26 illustrated in FIGS. 4A and 4B are denoted by the same reference numerals, and a detailed description is omitted.

Reference numerals 44A and 44B in FIGS. 4A and 4B include heat conductive members for promoting heat transfer between the left and right chassis 12A and 12B and equalizing the heat of each of the chassis 12A and 12B. A first heat conductive member 44A has, for example, a graphite sheet attached to the inner surface 12Ab of the first chassis 12A, and a protruding portion provided in a part close to the adjacent end portion 12Aa comes into contact with the rear cover component 36 in the 180-degree posture.

Since a second heat conductive member 44B has a substantially bilaterally symmetrical structure with the first heat conductive member 44A, a detailed description thereof is omitted. As a result, the heat conductive members 40A and 40B transfer heat between the chassis 12A and 12B via the rear cover component 36. The heat conductive members 40A and 40B may be omitted.

As illustrated in FIGS. 4A and 4B, the flexible board 26 includes a first folded portion 40a and a second folded portion 40b, a third folded portion 41a and a fourth folded portion 41b, and three fixed portions 42a to 42c.

As illustrated in FIG. 4A, in one or more embodiments, the flexible board 26 is placed on front surfaces of the heat conductive members 40A and 40B laid on the inner surfaces 12Ab and 12Bb of the chassis 12A and 12B around the hinge device 14, and is indirectly placed on the inner surfaces 12Ab and 12Bb. However, as described above, the heat conductive members 40A and 40B can be omitted. In this case, the flexible board 26 may be placed directly on the inner surfaces 12Ab and 12Bb. Therefore, in the following description, the flexible board 26 will be described as being directly placed on the inner surfaces 12Ab and 12Bb.

As illustrated in FIGS. 4A and 4B, the folded portions 40a and 40b are parts in which the flexible boards 26 are disposed in order in the first chassis 12A and folded back while being curved in the opposite directions to each other. The folded portions 40a and 40b are formed in a substantially S-shape as a whole when viewed from the side.

The first folded portion 40a is formed in a substantially C-shape when viewed from the side by folding back the flexible board 26 extending in the X1 direction along the inner surface 12Ab in the X2 direction. The second folded portion 40b is continuously provided on the first end portion 26a side of the first folded portion 40a in the longitudinal direction of the flexible board 26. The second folded portion 40b is formed in a C shape substantially bilaterally symmetrical with the first folded portion 40a by folding back the part that has extended in the X2 direction through the first folded portion 40a in the X1 direction.

The folded portions 40a and 40b are provided at positions offset to the first chassis 12A side (X1 side) from the adjacent end portions 12Aa and 12Ba. Specifically, most of the folded portions 40a and 40b are disposed on the X1 side of the first support plate 32A. As a result, the folded portions 40a and 40b are disposed in a first space S1 formed between the flat rear surface 30Ab of the first plate 30A and the flat inner surface 12Ab.

The first chassis 12A includes an internal space SA in which the motherboard 20 or the like, which is an electronic component, is accommodated, and a first standing wall 46A that partitions the internal space SA and the first space S1 (see FIG. 4A). The battery device 24 is also disposed in the internal space SA.

The first standing wall 46A is formed on the frame member 17A and stands upright in the Z1 direction from the inner surface 12Ab toward the first plate 30A side. That is, the first space S1 is formed between the frame member 17A and the first plate 30A or between the frame member 17A and the first support plate 32A. On the other hand, the internal space SA is formed between the outer surface of the frame member 17A on the X1 side of the first standing wall 46A and the inner surface of the cover member 18A. The first standing wall 46A is a part of the frame member 17A that partitions the spaces S1 and SA in a substantially Z-shape. Therefore, the folded portions 40a and 40b are disposed in the first space S1 between the hinge main body 31 and the rear cover component 36, and the first standing wall 46A, and the first folded portion 40a faces the first standing wall 46A.

The configurations of the folded portions 41a and 41b on the second chassis 12B side and the peripheral portions thereof may be substantially bilaterally symmetrical with the configurations of the folded portions 40a and 40b on the first chassis 12A side and the peripheral portions thereof. That is, the folded portions 41a and 41b are disposed in a second space S2 formed between the flat rear surface 30Bb of the second plate 30B and the flat inner surface 12Bb. In addition, the second chassis 12B also includes a second standing wall 46B that stands upright from the inner surface 12Bb in the Z1 direction and partitions an internal space SB in which the battery device 21 or the like, which is an electronic component, is accommodated and a second space S2. Therefore, the folded portions 41a and 41b are also disposed between the hinge main body 31 and the rear cover component 36, and the second standing wall 46B, and the third folded portion 41a faces the second standing wall 46B.

As illustrated in FIGS. 4A and 4B, the fixed portions 42a to 42c are parts where the flexible board 26 is fixed to the chassis 12A and 12B or the hinge main body 31 with a pressure sensitive adhesive 48 such as double-sided tape.

A first fixed portion 42a is provided between the second folded portion 40b and the first end portion 26a. The first fixed portion 42a is a part fixed to the frame member 17A immediately after going over the first standing wall 46A on the way from the second folded portion 40b to the motherboard 20. A second fixed portion 42b is provided between the fourth folded portion 41b and the second end portion 26b. The second fixed portion 42b is a part fixed to the frame member 17B immediately after going over the second standing wall 46B on the way from the fourth folded portion 41b to the battery device 21.

A third fixed portion 42c is provided between the folded portions 40a and 41a. The third fixed portion 42c is fixed to the hinge main body 31 inside the rear cover component 36. The third fixed portion 42c may be fixed to the rear cover component 36.

Next, an example of a method for attaching the flexible boards 26 to 28 to the chassis 12A and 12B will be described.

First, the flexible boards 26 to 28 are assembled with the hinge device 14. Specifically, the hinge device 14 fixes the third fixed portion 42c of the flexible boards 26 to 28 to the hinge main body 31 with the pressure sensitive adhesive 48, and then screws the rear cover component 36 to the hinge main body 31. As a result, the flexible boards 26 to 28 are integrated with the hinge device 14.

Next, the hinge device 14 assembled with the flexible boards 26 to 28 is attached to the frame members 17A and 17B disposed adjacent to each other on the left and right sides. The hinge device 14 is placed from top to bottom toward the spaces S1 and S2 of the frame members 17A and 17B, that is, toward the Z2 direction. Each of the brackets 34A and 34B is fastened to the frame members 17A and 17B with screws 50 (see FIG. 3).

Next, the folded portions 40a, 40b, 41a, and 41b are formed on the flexible boards 26 to 28. The folded portions 40a, 40b, 41a, and 41b can be easily formed by, for example, an operator using a fingertip or a predetermined instrument and bending the flexible boards 26 to 28 into a substantially S-shape.

Subsequently, the flexible boards 26 to 28 are fixed to the chassis 12A and 12B. As illustrated in FIG. 3, in the flexible boards 26, 27, and 28, each positioned portion 52 is provided between the folded portions 40a and 40b and the first end portions 26a, 27a, and 28a, and between the folded portions 41a and 41b and the second end portions 26b, 27b, and 28b. The positioned portion 52 is a recessed portion in which the flexible boards 26 to 28 are constricted in a width direction, or a stepped portion in which a width dimension of the flexible boards 26 to 28 is changed in a stepwise manner. On the other hand, the frame members 17A and 17B have a positioning portion 53 at a position corresponding to each of the positioned portions 52. The positioning portion 53 is a protruding portion or a stepped step portion that fits with the positioned portion 52. The circled enlarged view illustrated in FIG. 3 exemplifies an operation of fitting the positioned portion 52, which is a recessed portion, to the positioning portion 53, which is a protruding portion.

The positioned portion 52 and the positioning portion 53 may be provided only on one of the first chassis 12A side or the second chassis 12B of the flexible boards 26 to 28, or may not be provided at all. For example, the flexible board 26 illustrated in FIG. 3 exemplifies a configuration in which the positioned portion 52 and the positioning portion 53 are not provided between the folded portions 41a and 41b and the second end portion 26b.

In this way, the flexible boards 26 to 28 form the folded portions 40a, 40b, 41a, and 41b, and while maintaining these, fit each positioned portion 52 to the positioning portion 53. At the same time, the fixed portions 42a and 42b are fixed to the frame members 17A and 17B with the pressure sensitive adhesive 48.

As described above, the flexible boards 26 to 28 are attached to the chassis 12A and 12B. After that, by connecting each of the end portions 26a and 26b, and the like to the motherboard 20 and the like, the connection of the flexible boards 26 to 28 is also completed.

Next, the rotation operation of the chassis 12A and 12B and the operation of the flexible board 26 (27 and 28) at that time will be described.

First, in the 0-degree posture illustrated in FIG. 4B, the chassis 12A and 12B are in a folded state with high design, in which the chassis 12A and 12B are stacked with the surface normal directions substantially parallel to each other. At this time, the display 16 has a bell shape in which the folding region R3 is curved with a desired curvature. That is, in the display 16, the folding region R3 is folded into a desired bell shape by the plates 30A and 30B stacked in parallel with a predetermined gap. As a result, in the electronic apparatus 10, the chassis 12A and 12B are made as thin as possible, and the damage of the display 16 at the time of bending is also suppressed.

Next, a case in which the chassis 12A and 12B are rotated from the 0-degree posture to the 180-degree posture will be described. In this case, as illustrated in FIGS. 4A and 4B, the support plates 32A and 32B move relative to the hinge main body 31 while swinging along with the opening operation between the chassis 12A and 12B. The folding region R3 of the display 16 is gradually released from the folded state by the plates 30A and 30B that operate integrally with the chassis 12A and 12B.

In the 180-degree posture illustrated in FIG. 4A, the plates 30A and 30B, the hinge main body 31, and the support plates 32A and 32B are respectively aligned on the same XY plane, and the front surfaces thereof are disposed flush with each other to form a flat plate as a whole. In the display 16, the entire rear surface 16a is supported on the flat plate, and one flat plate-shaped large screen is formed (see FIG. 2).

Next, a case in which the chassis 12A and 12B are rotated from the 180-degree posture to the 0-degree posture will be described. In this case, the support plates 32A and 32B swing again between the chassis 12A and 12B, and move relative to the hinge main body 31 along with the closing operation. The display 16 receives a bending force from the plates 30A and 30B that operate integrally with the chassis 12A and 12B, and the folding region R3 is gradually folded. As a result, the folding region R3 again forms a substantially bell shape in the 0-degree posture illustrated in FIG. 4B.

It is necessary that the length of the display 16 does not change during such a rotation operation. This is because when the display 16 receives an expansion/contraction load, there is a concern that the display 16 may be damaged or malfunction. Therefore, the electronic apparatus 10 suppresses the expansion/contraction load when bending the display 16 by coinciding the center of rotation between the chassis 12A and 12B with the front surface of the display 16.

On the other hand, the flexible board 26 (27 and 28), which is below the display 16 and is outside the center of rotation between the chassis 12A and 12B, receives an expansion/contraction operation. That is, the flexible board 26 (27 and 28) receives a tensile force when changing from the 180-degree posture to the 0-degree posture. The flexible board 26 (27 and 28) receives a compressive force when changing from the 0-degree posture to the 180-degree posture. Therefore, the flexible board 26 (27 and 28) needs to be able to smoothly absorb the extra length caused by such an expansion/contraction load.

Therefore, the flexible board 26 (27 and 28) of one or more embodiments includes the folded portions 40a, 40b, 41a, and 41b to enable smooth extra-length absorption.

Specifically, in the 180-degree posture illustrated in FIG. 4A, the folded portions 40a and 40b retain a large extra length and are free to move between the flat rear surface 30Ab and the inner surface 12Ab. Therefore, during the operation from the 180-degree posture to the 0-degree posture, the folded portions 40a and 40b are pulled by the third fixed portion 42c as illustrated by an arrow in FIG. 4B, move to the hinge main body 31 side while releasing the retained extra length. At this time, the folded portions 40a and 40b are gradually sent out to the hinge main body 31 side while maintaining the curved shape, although the radius of the arc is slightly smaller.

When rotating from the 0-degree posture to the 180-degree posture, the operation opposite to the above occurs. That is, the folded portions 40a and 40b are gradually sent out to the first end portion 26a side while recovering the extra length reduced in the 0-degree posture. As a result, the folded portions 40a and 40b are restored to their original shapes with a large extra length again in the 180-degree posture.

Since the operations of the folded portions 41a and 41b on the second chassis 12B side are substantially bilaterally symmetrical with the operations of the folded portions 40a and 40b on the first chassis 12A side described above, a detailed description thereof is omitted.

As described above, when the chassis 12A and 12B are rotated, in the flexible boards 26 to 28, the extra length held by the folded portions 40a, 40b, 41a, and 41b increases or decreases, and the substantially S-shape thereof is retained. As a result, the flexible boards 26 to 28 can smoothly absorb the extra length when the chassis 12A and 12B are rotated, and can suppress the occurrence of disconnection or the like due to excessive stretching stress.

Here, a configuration that does not have the folded portions 40a, 40b, and the like will be considered. With this configuration, the extra length of the flexible board cannot be controlled. For this reason, in this configuration, there is a concern that the flexible board appropriately forms, for example, a wave shape or a bending shape in a gap in the chassis in a case of the 180-degree posture, and forms a different shape at each rotation. As a result, in this configuration, there is a concern that the flexible board receives a large load during the expansion/contraction operation, and there is also a concern that the thickness of the chassis has to be increased in order to absorb the extra length. Further, there is a concern that the flexible board remaining in the 180-degree posture may run wild in the chassis and be caught by other members or components, so that the rotation operation to the 0-degree posture may be hindered, or a connector portion of the flexible board or the like may come off.

On the other hand, the flexible boards 26 to 28 of one or more embodiments can always maintain a constant shape even in a case in which the rotation operation between the chassis 12A and 12B is repeatedly executed, and it is possible to suppress the occurrence being caught by other members.

In particular, the flexible boards 26 to 28 of one or more embodiments have the first fixed portion 42a between the folded portions 40a and 40b and the first end portion 26a, and the like, the second fixed portion 42b between the folded portions 41a and 41b and the second end portion 26b, and the like, and the third fixed portion 42c between the folded portions 40a and 41a. Therefore, it is possible to more accurately control the operation of the folded portions 40a and 40b, and the like at the time of absorbing the extra length, and to maintain a substantially S-shape of the folded portions 40a and 40b, and the like for a long period of time.

The electronic apparatus 10 has the folded portions 40a, 40b, 41a, and 41b in the spaces S1 and S2 formed between the flat rear surfaces 30Ab and 30Bb of the plates 30A and 30B and the flat inner surfaces 12Ab and 12Bb of the chassis 12A and 12B. Therefore, in the flexible boards 26 to 28, it is possible to further prevent the folded portions 40a, 40, 41a, and 41b from being lifted or twisted. Further, in the flexible boards 26 to 28, the increase/decrease operation of the extra length becomes smoother, and it is possible to further suppress being caught by other members.

In the electronic apparatus 10, the chassis 12A and 12B include standing walls 46A and 46B that stand upright from the inner surfaces 12Ab and 12Bb of the chassis 12A and 12B toward the plates 30A and 30B side. Here, the standing walls 46A and 46B partition the internal spaces SA and SB in which electronic components such as the motherboard 20 and the battery device 21 are disposed and the spaces S1 and S2 in which the folded portion 40a and the like are disposed. Therefore, the electronic apparatus 10 can isolate the folded portion 40a and the like from the internal spaces SA and SB provided with many electronic components, and can further suppress the folded portion 40a and the like that perform advancing and retreating operations from being caught by other members.

Here, since the internal spaces SA and SB accommodating the electronic components open in the opposite direction from the display 16 side, that is, downward, the cover members 18A and 18B can be removed for easy maintenance of the motherboard 20 and the like. On the other hand, the spaces S1 and S2 accommodating the folded portion 40a and the like are partitioned from the internal spaces SA and SB by the standing walls 46A and 46B, and open upward facing the display 16 side, so that the spaces S1 and S2 are not opened when the cover members 18A and 18B are removed. As a result, at the time of maintenance of the motherboard 20 or the like, it is possible to prevent the folded portion 40a or the like from receiving unintended interference and the curved shape being eliminated or to prevent the fixed portion 42a or the like from coming off.

Figure 5:
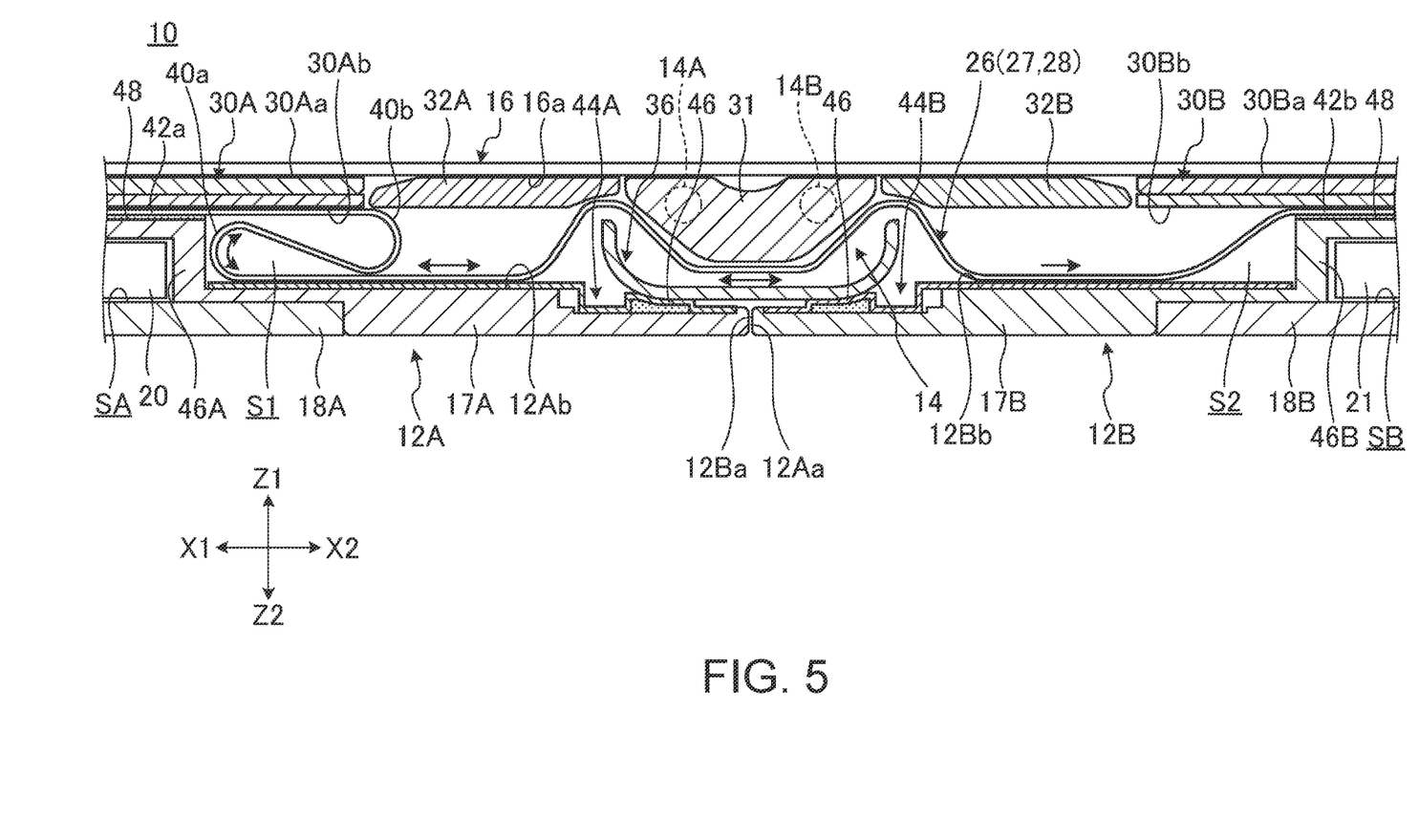
FIG. 5 is a schematic side cross-sectional view illustrating an extra length absorption structure according to a modification example of a flexible board.

FIG. 5 is a schematic side cross-sectional view illustrating an extra length absorption structure according to a modification example of the flexible boards 26 to 28.

As illustrated in FIG. 5, the flexible board 26 (27 and 28) may have a configuration in which, for example, the folded portions 41a and 41b on the second chassis 12B side are omitted. In this case, the flexible board 26 (27 and 28) is configured to be movable relative to the hinge main body 31 in the X direction by omitting the third fixed portion 42c. Accordingly, the flexible board 26 (27 and 28) can absorb the expansion/contraction load generated during the rotation operation between the chassis 12A and 12B by the extra length absorbing action of the folded portions 40a and 40b.

In addition, the configuration example illustrated in FIG. 5 requires twice the extra length absorption amount at the folded portions 40a and 40b as compared with the configuration example illustrated in FIGS. 4A and 4B. However, the configuration example illustrated in FIG. 5 can be effectively used, for example, in a case in which the first space S1 on the first chassis 12A side can be largely secured, but the space for installing the folded portions 41a and 41b on the second chassis 12B side cannot be secured. Needless to say, contrary to the configuration illustrated in FIG. 5, the folded portions 40a and 40b on the first chassis 12A side may be omitted.

The present invention is not limited to the above-described embodiments, and modification is freely possible without departing from the gist of the present invention.

In the above, the electronic apparatus 10 that is capable of being folded in half like a book is exemplified. It is possible to apply the present invention to, in addition to a configuration of folding the same-shaped chassis in half, for example, various configurations, such as a double-door configuration in which small chassis are foldably connected to the left and right edge portions of a large chassis, an S-shaped folding configuration in which chassis with different folding directions are connected to the left and right edge portions of one chassis, and a J-shaped folding configuration in which a small chassis is foldably connected to one of the left and right edge portions of a large chassis, and the number of chassis to be connected may be four or more.

DESCRIPTION OF SYMBOLS 10 electronic apparatus
12A first chassis
12B second chassis
14 hinge device
16 display
20 motherboard
21, 24 battery device
26 to 28 flexible board
30A first plate
30B second plate
31 hinge main body
36 rear cover component
40a first folded portion
40b second folded portion
41a third folded portion
41b fourth folded portion
42a first fixed portion
42b second fixed portion 42c third fixed portion
46A first standing wall
46B second standing wall

What is claimed:

1. An electronic apparatus comprising:
a first chassis equipped with a first electronic component;
a second chassis adjacent to the first chassis and equipped with a second electronic component;
a hinge device that relatively rotatably connects the first chassis and the second chassis between
  a first posture in which the first chassis and the second chassis are stacked so as to overlap each other in a surface normal direction and
  a second posture in which the first chassis and the second chassis are aligned in a direction perpendicular to the surface normal direction; and
a flexible board provided over the first chassis and the second chassis and connecting the first electronic component and the second electronic component, wherein
the flexible board has a first folded portion and a second folded portion that are disposed in order and curved in opposite directions to each other in the first chassis,
the first folded portion and the second folded portion each cause the flexible board to overlap itself in a thickness direction of the first chassis to form in an S-shape, and
at a location between the first folded portion and the second folded portion, there are three layers of the flexible board in the thickness direction of the first chassis.

2. The electronic apparatus according to claim 1, wherein the flexible board further has a third folded portion and a fourth folded portion that are disposed in order and curved in opposite directions to each other in the second chassis.

3. The electronic apparatus according to claim 2, wherein the flexible board has
  a first fixed portion fixed to the first chassis at a position closer to the first electronic component than the first folded portion and the second folded portion,
  a second fixed portion fixed to the second chassis at a position closer to the second electronic component than the third folded portion and the fourth folded portion, and
  a third fixed portion fixed to the hinge device between the first fixed portion and the second fixed portion.

4. The electronic apparatus according to claim 3, further comprising:
  a display provided over the first chassis and the second chassis and having a folding region that is folded according to relative rotation of the first chassis and the second chassis;
  a first plate fixed to the first chassis and supporting a rear surface of the display on a front surface; and
  a second plate fixed to the second chassis and supporting the rear surface of the display on a front surface, wherein
  the first folded portion and the second folded portion are disposed in a first space formed between a flat rear surface of the first plate and a flat inner surface of the first chassis, and
  the third folded portion and the fourth folded portion are disposed in a second space formed between a flat rear surface of the second plate and a flat inner surface of the second chassis.

5. The electronic apparatus according to claim 4, wherein
  the first chassis has a first standing wall that stands upright from the inner surface of the first chassis toward a side of the first plate, and that partitions a space in which the first electronic component is disposed and the first space,
  the second chassis has a second standing wall that stands upright from the inner surface of the second chassis toward the side of the first plate, and that partitions a space in which the second electronic component is disposed and the second space,
  the second folded portion is disposed to face the first standing wall, and
  the fourth folded portion is disposed to face the first standing wall.

6. The electronic apparatus according to claim 1, wherein the flexible board has
  a first fixed portion fixed to the first chassis at a position closer to the first electronic component than the first folded portion and the second folded portion, and
  a second fixed portion fixed to the second chassis.

7. The electronic apparatus according to claim 6, further comprising:
  a display provided over the first chassis and the second chassis and having a folding region that is folded according to relative rotation of the first chassis and the second chassis; and
  a plate fixed to the first chassis and supporting a rear surface of the display on a front surface, wherein
  the first folded portion and the second folded portion are disposed in a space formed between a flat rear surface of the plate and a flat inner surface of the first chassis.

8. The electronic apparatus according to claim 1, wherein
  at the location between the first folded portion and the second folded portion, there are three layers of the flexible board in the thickness direction of the first chassis in both the first posture and the second posture.

* * * * *